(12) United States Patent
Kobayashi

(10) Patent No.: US 7,177,102 B2
(45) Date of Patent: Feb. 13, 2007

(54) LENS BODY TUBE

(75) Inventor: Tomoaki Kobayashi, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 11/258,859

(22) Filed: Oct. 27, 2005

(65) Prior Publication Data

US 2006/0092530 A1    May 4, 2006

(30) Foreign Application Priority Data

Oct. 29, 2004   (JP)   ............................. 2004-315248

(51) Int. Cl.
*G02B 7/02* (2006.01)
(52) U.S. Cl. .................... 359/811; 359/819; 359/813
(58) Field of Classification Search ................ 359/811, 359/813, 814, 815, 819, 821, 822, 823, 824, 359/825
See application file for complete search history.

(56) References Cited

U.S. PATENT DOCUMENTS 6,714,359 B2    3/2004   Kobayashi
6,867,926 B2 *  3/2005   Iikawa et al. ............... 359/701

FOREIGN PATENT DOCUMENTS

JP    6-160688    6/1994
JP    2003-202483 7/2003

OTHER PUBLICATIONS

English Language Abstract of JP 2003-202483.
U.S. Appl. No. 11/258,860 to Hamasaki et al., filed on Oct. 27, 2005.
U.S. Appl. No. 11/272,894 to Hamasaki ., filed on Nov. 15, 2005.

* cited by examiner

*Primary Examiner*—Timothy Thompson
(74) *Attorney, Agent, or Firm*—Greenblum & Bernstein, P.L.C.

(57) ABSTRACT

A lens body tube configured to support at least one lens inside an inner tube such that the at least one lens can be translated along the optical axis direction of the lens body tube includes a cam ring configured to be rotatably supported around the outer circumferential surface of the inner tube, the at least one lens being configured to be translated along the optical axis direction accompanied by the rotation of the cam ring, a plurality of cams provided on the inner circumferential surface of the cam ring, and a plurality of cam followers provided on a lens frame supporting each of the at least one lens. Each of the plurality of cam followers is engaged with a corresponding one of the plurality of cams. The plurality of cams includes at least two protruded cams. The at least two protruded cams are connected with a part of each other.

13 Claims, 6 Drawing Sheets

LENS BODY TUBE

BACKGROUND OF THE INVENTION

The present invention relates to a lens body tube configured to carry out a zooming operation and/or a focusing operation with a plurality of lenses being translated along the optical axis direction of the lens body tube using a cam ring.

In a lens body tube that is configured to carry out a zooming operation and/or a focusing operation with lenses incorporated in the lens body tube being translated along the optical axis direction of the lens body tube, a cam ring to be rotated is formed with cams, each of which is engaged with a corresponding one of cam followers provided at the side of the lenses. That is, accompanied by the cam ring being rotated integrally with a zoom ring or a focus ring being rotated during a zooming operation or a focusing operation, the lenses are translated along the optical axis direction of the lens body tube according to the shapes of the cams, with which the lenses are engaged, to carry out the zooming operation or the focusing operation.

A cam ring for simultaneously moving a plurality of lenses is required to be formed with a plurality of cams corresponding to the respective lenses. Recently, this kind of cam ring is fabricated by resin molding, and is generally formed in a metal mold that is divided in the optical axis direction. Therefore, when a plurality of cams are formed as cams protruded from the inner circumferential surface of the cam ring, and are arranged in the optical axis direction, it is hard to demold the cam ring from the metal mold because the plurality of cams lie in the way of the metal mold being released. For this reason, Japanese Unexamined Patent Publication No. HEI6-160688 discloses a technique where any adjacent two of cams in the circumferential direction is formed not to overlap in a releasing direction of a metal mold (in the optical axis direction). In addition, Japanese Unexamined Patent Publication No. 2003-202483 proposes a technique where one of a pair of cams is formed into a protruded shape, and the other is formed into a recessed shape.

For example, in the technique of Japanese Unexamined Patent Publication No. 2003-202483, as shown in FIG. 6, on the inner circumferential surface of a cam ring 2A that is fitted around the outer circumferential surface of an inner tube 11 of a main tube 1 of a lens body tube, there are formed a recessed cam 21A and a protruded cam 22A. The cams 21A and 22A are engaged with cam followers 32A and 42A that are included by lens groups 3 and 4 movable along a guide groove 112 extending in the optical axis direction in the inner tube 11, respectively. In this lens body tube, when the cam ring 2A is rotated, the cam followers 32A and 42A of the lens groups 3 and 4 are translated along the optical axis direction according to the shapes of the cams 21A and 22A, so that the lens body tube can be set in a desired zooming condition. Moreover, when the cam ring 2A is configured with the recessed cam 21A and the protruded cam 22A in this way, a metal mold for forming the cam ring 2A by resin molding is allowed to be configured as a pair of molds separated in the optical axis direction by the protruded cam 22A defined as a separating plane.

The technique disclosed in Japanese Unexamined Patent Publication No. HEI6-160688 cannot be applied to a lens body tube provided with two cams that are required to overlap in the optical direction. Especially, a recent lens body tube tends to be longer so as to accomplish a zooming operation with a greater change ratio of a focal length, and the technique is therefore hard to meet such a lens body tube. In addition, in any technique described in Japanese Unexamined Patent Publication No. HEI6-160688 and Japanese Unexamined Patent Publication No. 2003-202483, since each of a plurality of cams formed on the cam ring has an independent structure, each of the cams does not have a sufficient strength for bearing a stress that is applied from a cam follower provided at the side of a lens, and is thereby easy to be damaged. For this reason, the radial thickness of the cam ring is required to be more than a predetermined thickness, and is thereby an obstacle when the diameter of the cam ring is made smaller. Especially, in the technique of Japanese Unexamined Patent Publication No. 2003-202483 as shown in FIG. 6, at a portion, formed with the recessed cam 21A, of the cam ring 2A, it is necessary to make the radial thickness of the cam ring 2A thicker by a radial depth of the recessed cam 21A and to make the cam ring 2A protruded outward along the radial direction. Therefore, it is very difficult to make the diameter of the cam ring 2A smaller.

SUMMARY OF THE INVENTION

The present invention is advantageous in that a lens body tube, which is provided with a cam ring that has sufficient strength even though the radial thickness of the cam ring is made thinner, is provided. The present invention is also advantageous in that a lens body tube, which is easily fabricated by resin molding, is provided.

According to an aspect of the invention, there is provided a lens body tube configured to support at least one lens inside an inner tube such that the at least one lens can be translated along the optical axis direction of the lens body tube, which is provided with a cam ring configured to be rotatably supported around the outer circumferential surface of the inner tube, the at least one lens being configured to be translated along the optical axis direction accompanied by the rotation of the cam ring, a plurality of cams provided on the inner circumferential surface of the cam ring, and a plurality of cam followers provided on a lens frame supporting each of the at least one lens, each of the plurality of cam followers being engaged with a corresponding one of the plurality of cams. The plurality of cams includes at least two protruded cams. The at least two protruded cams are connected with a part of each other.

Optionally, the plurality of cams may include at least one pair of adjacent protruded cams. Optionally, two cams of each of the at least one pair of adjacent protruded cams may be connected with a part of each other.

Further optionally, the at least two protruded cams may be connected with one end of each other in the optical axis direction.

Alternatively or optionally, two cams of each of the at least one pair of adjacent protruded cams may be connected with one end of each other in the optical axis direction.

Optionally, the cam ring may include at least one protruded portion on the inner circumferential surface at one end thereof. Alternatively or optionally, the at least two protruded cams may be connected with each other through the at least one protruded portion.

Yet optionally, the at least one pair of adjacent protruded cams may be arranged in the circumferential direction of the lens body tube such that each adjacent pairs thereof in the circumferential direction are not overlapped in the optical axis direction. Optionally, two cams of each of the at least one pair of adjacent protruded cams may be overlapped in the optical axis direction. In this case, each of the at least one pair of adjacent protruded cams may include one linear cam that extends farther from the connected end thereof in the optical direction than the other.

Optionally, the cam ring may be formed by resin molding.

Still optionally, each of the protruded cams may have a rectangular cross section.

Optionally, the cam ring may be rotated during one of a zooming operation and a focusing operation.

BRIEF DESCRIPTION OF THE ACCOMPANYING DRAWINGS

DETAILED DESCRIPTION OF THE EMBODIMENTS

Figure 1:
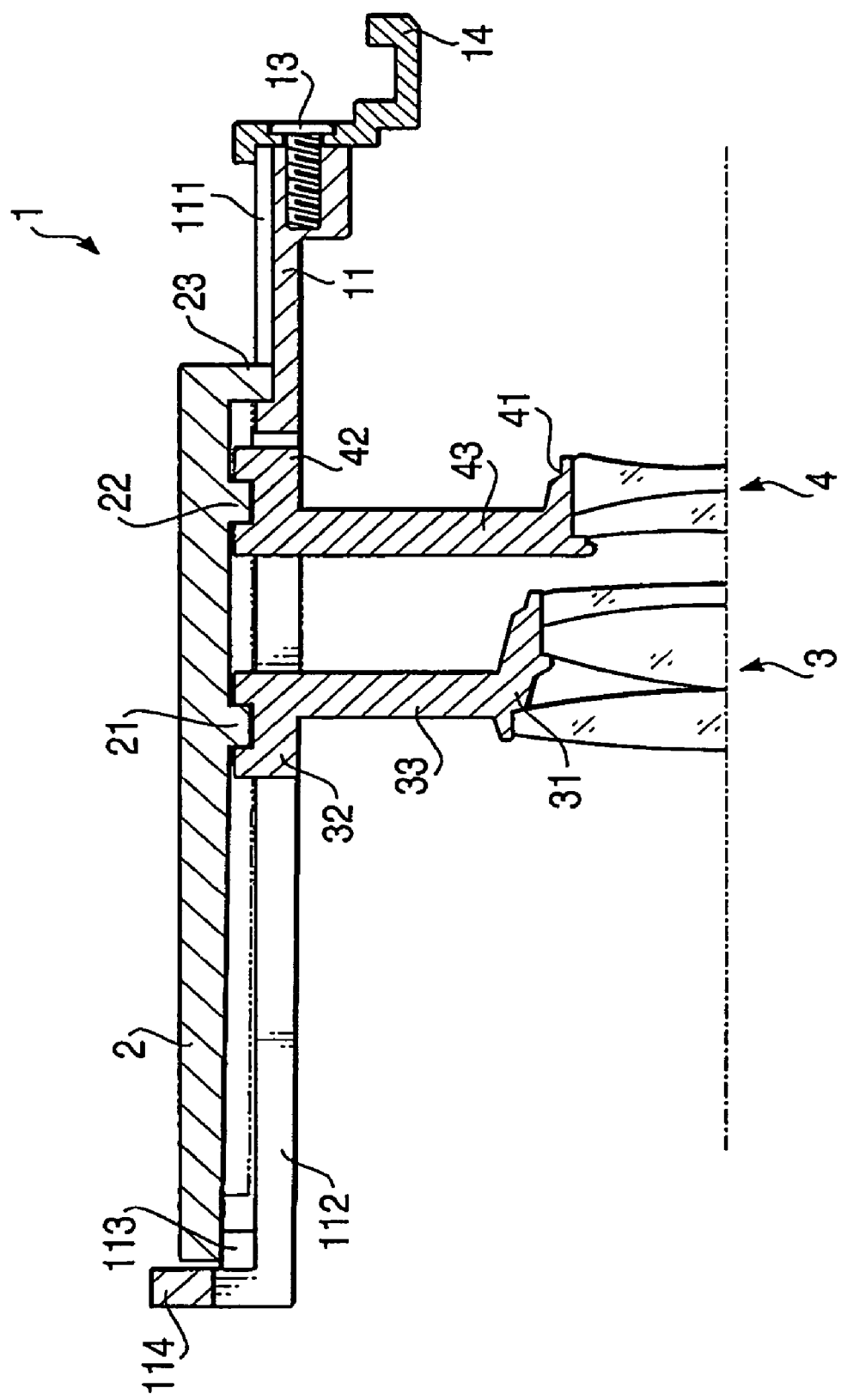
FIG. 1 is a half cross-sectional view of a lens body tube in an embodiment according to the present invention with respect to the optical axis of the lens body tube.

An embodiment according to the present invention will be explained with reference to accompanying drawings. FIG. 1 is a half cross-sectional view of a lens body tube according to the present invention with respect to the optical axis of the lens body tube, which shows only the structure constituted by a cam ring and two lens groups that are movable along the optical axis direction based on rotation of the cam ring. In the lens body tube, a main tube 1 is configured with an inner tube 11 shown in FIG. 1 and an outer tube (not shown), and is integrally provided around the inner tube 11. On the rear end of the main tube, there is fixed a bayonet portion 14 with a screw 13. Thereby, the lens body tube is attachable to a lens mount of a camera body (not shown). The inner tube 11 is configured as a guide tube for translatory movement of below-mentioned lens groups along the optical axis. Around the inner tube 11, there is fitted a cam ring 2 that is formed into a hollow cylinder by resin molding. The cam ring 2 is configured rotatable around the optical axis with a zoom ring (not shown) fitted on the outer tube. In addition, in the inner tube 11, there is, movably along the optical axis direction, supported a plurality of lens groups, i.e., a first lens group 3 and a second lens group 4 in this case. Respective lens frames 31 and 41 supporting the lens groups 3 and 4 are provided with cam followers 32 and 42, respectively, which are engaged with the cam ring 2.

Figure 2:
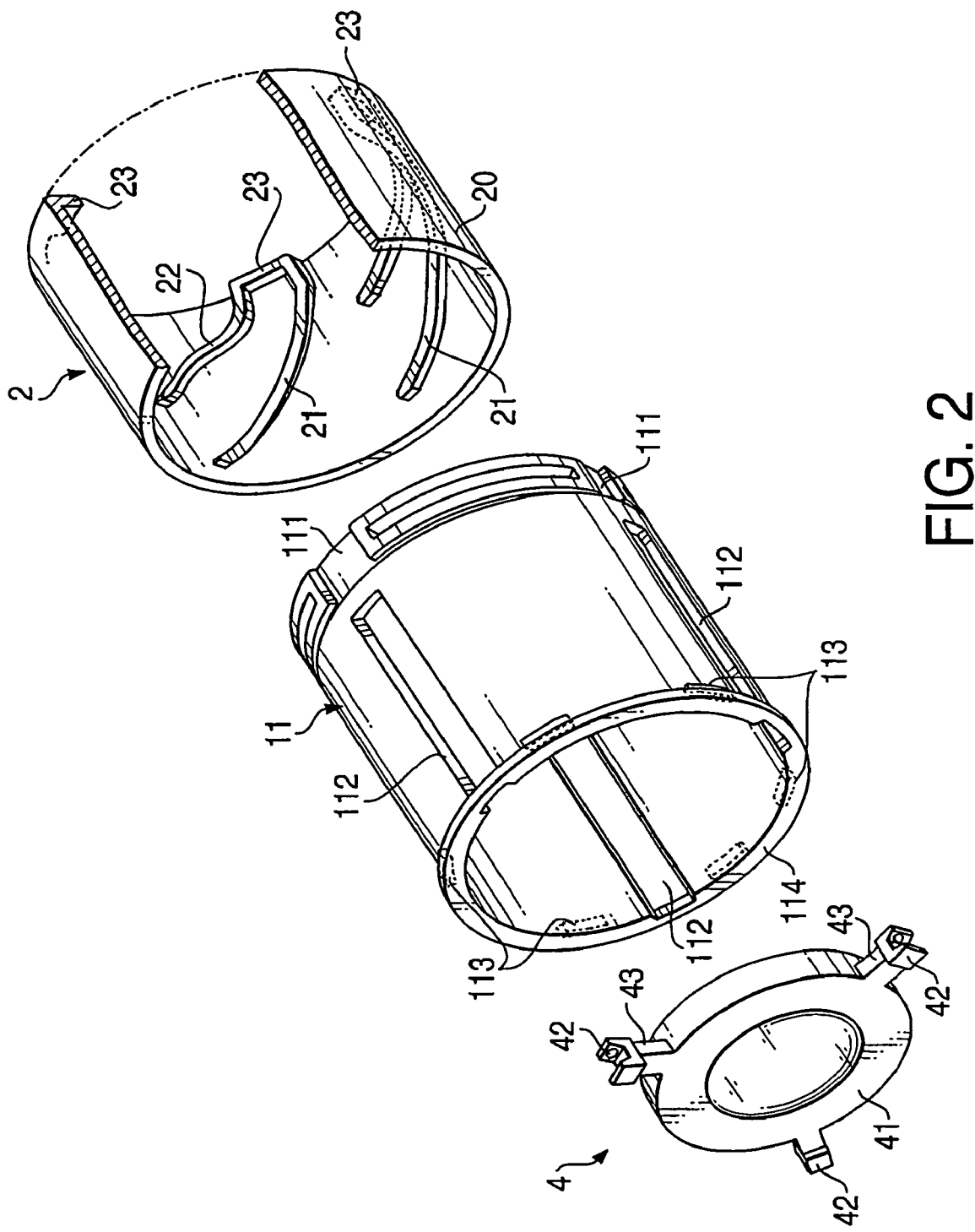
FIG. 2 is a perspective view schematically showing the constitution of a major portion of the lens body tube.
Figure 3:
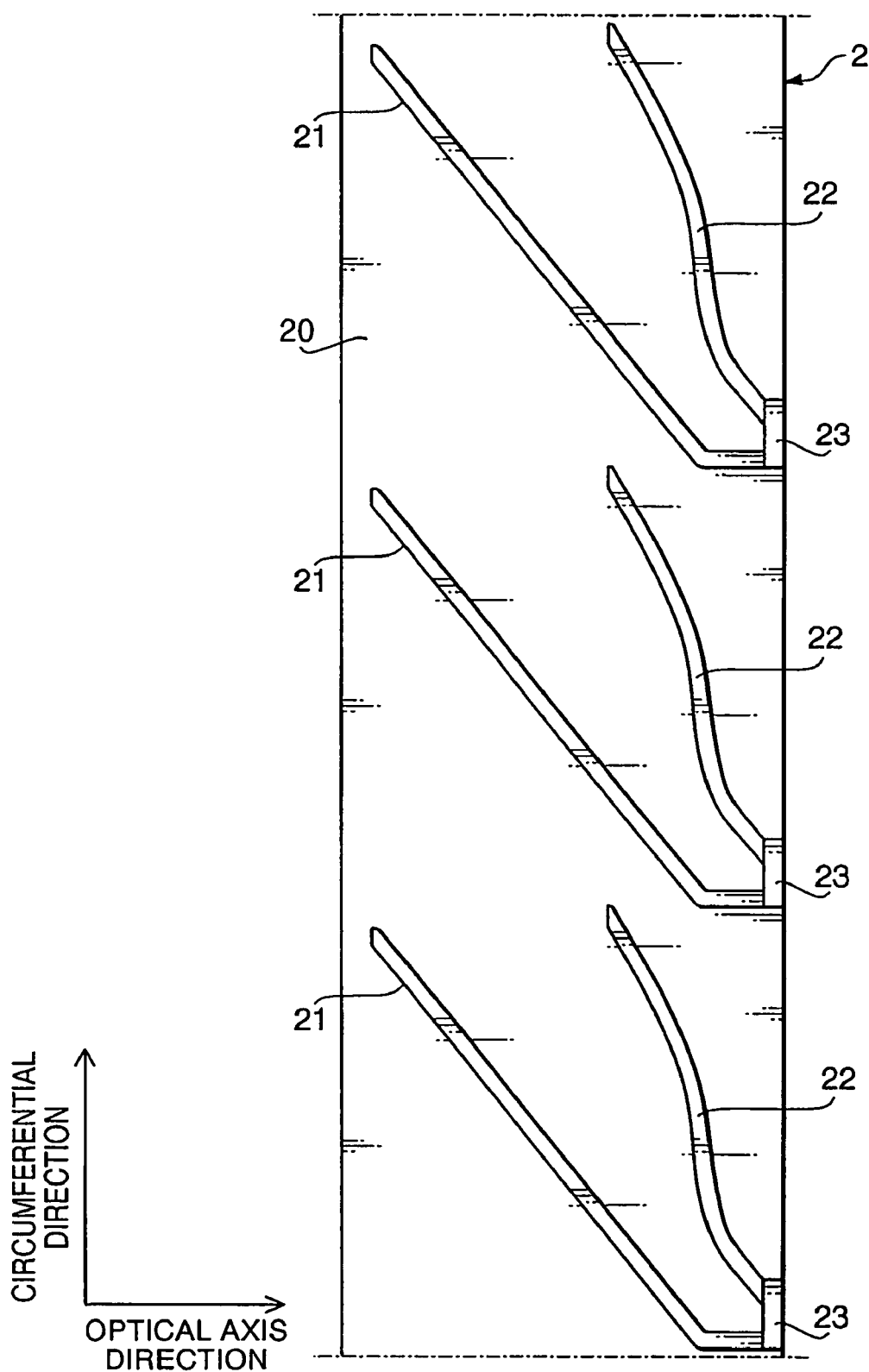
FIG. 3 is a development elevation of the inner circumferential surface of a cam ring in the embodiment.

FIG. 2 is a perspective view that schematically shows the constitution of the inner tube 11, the cam ring 2, and the second lens group 4. Since the first lens group 3 is substantially the same as the second lens group 4, the first lens group 3 is not shown in FIG. 2. The cam ring 2 is formed with a first cam 21 and a second cam 22 that are provided on the inner circumferential surface of a ring portion 20 formed of a hollow cylinder. The first and second cams 21 and 22 are protruded inward along the radial direction, and have rectangular cross sections, respectively. FIG. 3 is a development elevation of the inner circumferential surface of the cam ring 2. In this case, both of the first and second cams 21 and 22 are formed on each of three areas into which the inner circumferential surface of the cam ring 2 is divided equally along the circumferential direction, and three pairs of the first and second cams 21 and 22 have substantially the same shape. The first cam 21 is formed as a linear cam that is slanted to the optical axis direction in the development elevation. The second cam 22 is formed as a non-linear cam of which curvature is partially different. The first and second cams 21 and 22 are overlapped in the optical axis direction with each other in a more front side area in the optical direction than the second cam 22 (in a left area of FIG. 3), while the second cam 22 is not overlapped in the optical direction with any adjacent first cams 21 in the circumferential direction in a more rear side area in the optical direction than the second cam 22 (in a right side area of FIG. 3).

In addition, on the rear end of the ring portion 20 of the cam ring 2 in the optical axis direction, there are formed three bayonet pieces 23 that are arranged in the circumferential direction and are protruded inward along the radial direction. Each of the bayonet pieces 23 is engaged with a corresponding one of bayonet portions 111 that are formed at three places in the circumferential direction on the outer circumferential surface of the rear end of the inner tube 11 in the optical axis direction, so as to prevent the cam ring 2 from dropping off the inner tube 11. It is noted that each of the bayonet pieces 23 is configured to have sufficient length in the circumferential direction such that the engagement with the bayonet portion 111 is not disengaged even though the cam ring 2 is rotated during a zooming operation. Each of the first and second cams 21 and 22 is connected with a corresponding one of the bayonet pieces 23 at the rear end of the cam ring 2 in the optical direction. As a result, the first and second cams 21 and 22 are connected with one another through the bayonet piece 23.

At each of three places, which are evenly spaced apart in the circumferential direction, of the inner tube 11, there is formed the guide groove 112 extending in the optical axis direction. In addition, on the leading end of the inner tube 11 in the optical axis direction, there is integrally formed a flange 114 that is protruded outward along the radial direction. At each of six places along the flange 114 in the circumferential direction on the inner tube 11, there is integrally formed a circular-arc-shaped bearing rib 113. These six bearing ribs 113 are formed at places that do not interfere with the guide grooves 112. The flange 114 regulates the position of the leading end of the cam ring 2 in the optical axis direction, when the cam ring 2 is fitted around the inner tube 11. The bearing ribs 113 bear the inner circumferential surface of the leading end of the cam ring 2. The cam ring 2 is concentrically supported along the outer circumferential surface of the inner tube 11 by the bearing ribs 113 and the bayonet pieces 23.

Figure 4:
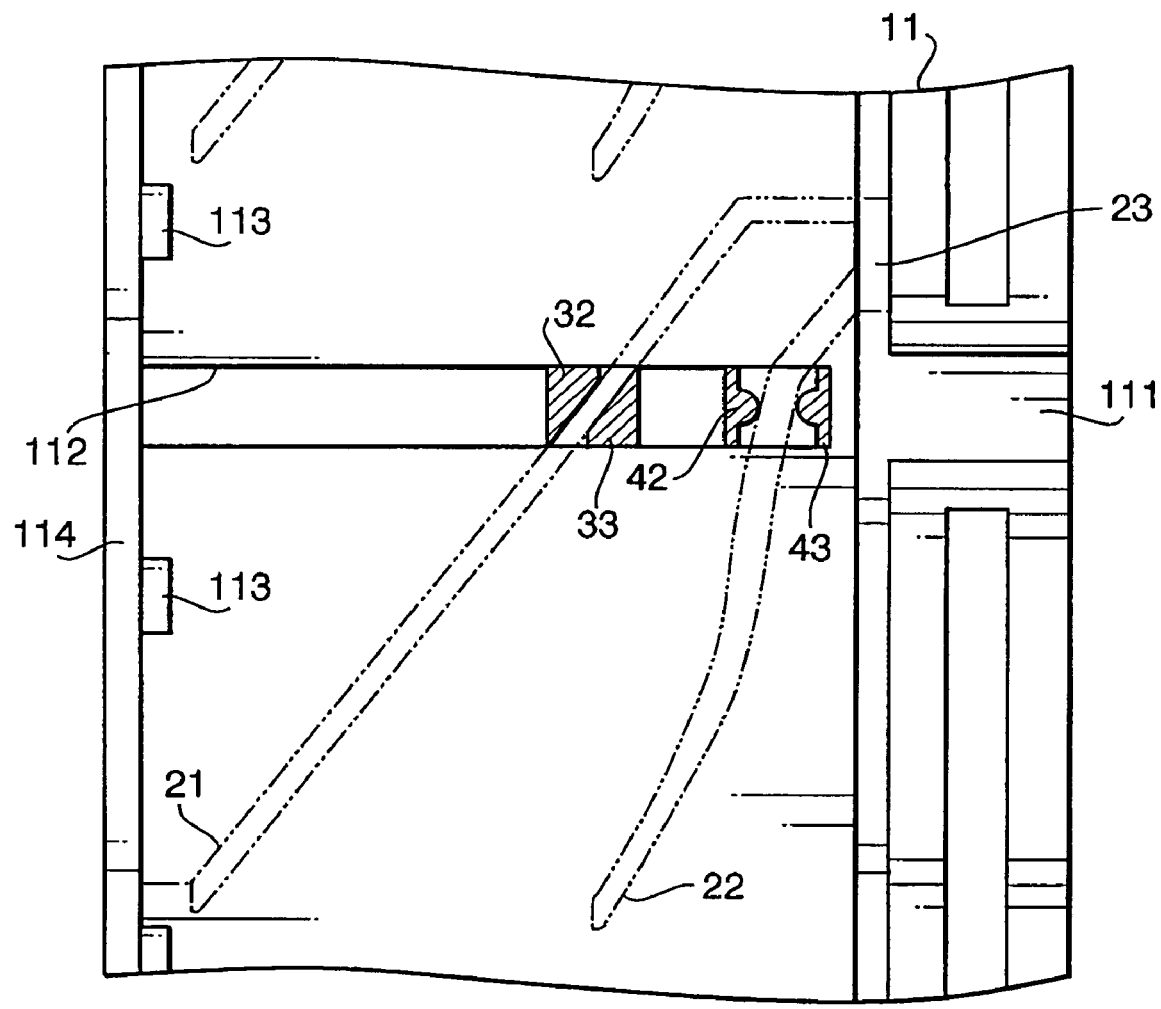
FIG. 4 is a top view of an inner tube in the embodiment.

As shown in FIG. 2, each of three portions on the outer circumferential surface of the lens frame 41 of the second lens group 4 is protruded to form a radially extending stem 43 to be passed completely through a corresponding one of the three guide grooves 112 from the inside to the outside of the inner tube 11. On the leading end face of each of the stems 43, there is formed the bifurcated cam follower 42, which is placed opposite the inner circumferential surface of the cam ring 2. In a similar manner, the lens frame 31 of the first lens group 3 (not shown) is provided with stems 33 that are radially protruded therefrom. On the leading end face of each of the stems 33, there is formed the cam follower 32, which is placed opposite the inner circumferential surface of the cam ring 2. In this case, as shown in FIG. 4 that is a top view of the inner tube 11, the cam follower 32 of the first lens group 3 is formed tapered to grip the first cam 21 in the optical axis direction in surface contact condition. The cam follower 42 of the second lens group 4 is provided with a pair of spherical surfaces to grip the second cam 22 in the optical axis direction in point contact condition.

According to the lens body tube that have the aforementioned constitution, when the cam ring 2 is rotated accompanied by a rotating operation of the zoom ring (not shown), the first and second lens groups 3 and 4 are translated along the optical axis direction by the cam followers 32 and 42 being moved according to the shape of the first and second cams 21 and 22, respectively. Accompanied by rotation of the cam ring 2, the cam followers 32, which are engaged with the first cams 21, of the first lens group 3 are moved along the optical axis direction in the guide grooves 112, so that the first lens group 3 can be translated along the optical axis direction. In a similar fashion, accompanied by rotation of the cam ring 2, the cam followers 42, which are engaged with the second cams 22, of the second lens group 4 are moved along the optical axis direction in the guide grooves 112, so that the second lens group 4 can be translated along the optical axis direction. Thereby, the first and second lens groups 3 and 4 are set at respective required positions on the optical axis to obtain a desired zooming value, i.e., desired focal length.

During the zooming operation, a stress is applied to the first cams 21 from the cam followers 32 of the first lens group 3, and a stress is also applied to the second cams 22 from the cam followers 42 of the second lens group 4. At this time, since the first and second cams 21 and 22 are integrally provided with the bayonet piece 23 at the rear end of the cam ring 2 in the optical axis direction, a stress applied to each of the cams 21 and 22 is absorbed by the bayonet piece 23, so that the damage of each of the cams 21 and 22 is reduced. In addition, the bayonet piece 23, at the same time, is engaged with the bayonet portion 111 of the inner tube 11 to regulate the position of the cam ring 2 in the optical axis direction, while the mechanical strength of the bayonet piece 23 itself is improved by connecting the first and second cams 21 and 22 with each other. Therefore, even though the radial thickness of the ring portion 20 is made thinner than the conventional one, it is possible to keep the mechanical strength of the cam ring 2 higher than the conventional one. Thereby, the diameter of the cam ring 2 is allowed to be made smaller, or that of the lens body tube is allowed to be made smaller.

Figure 5:
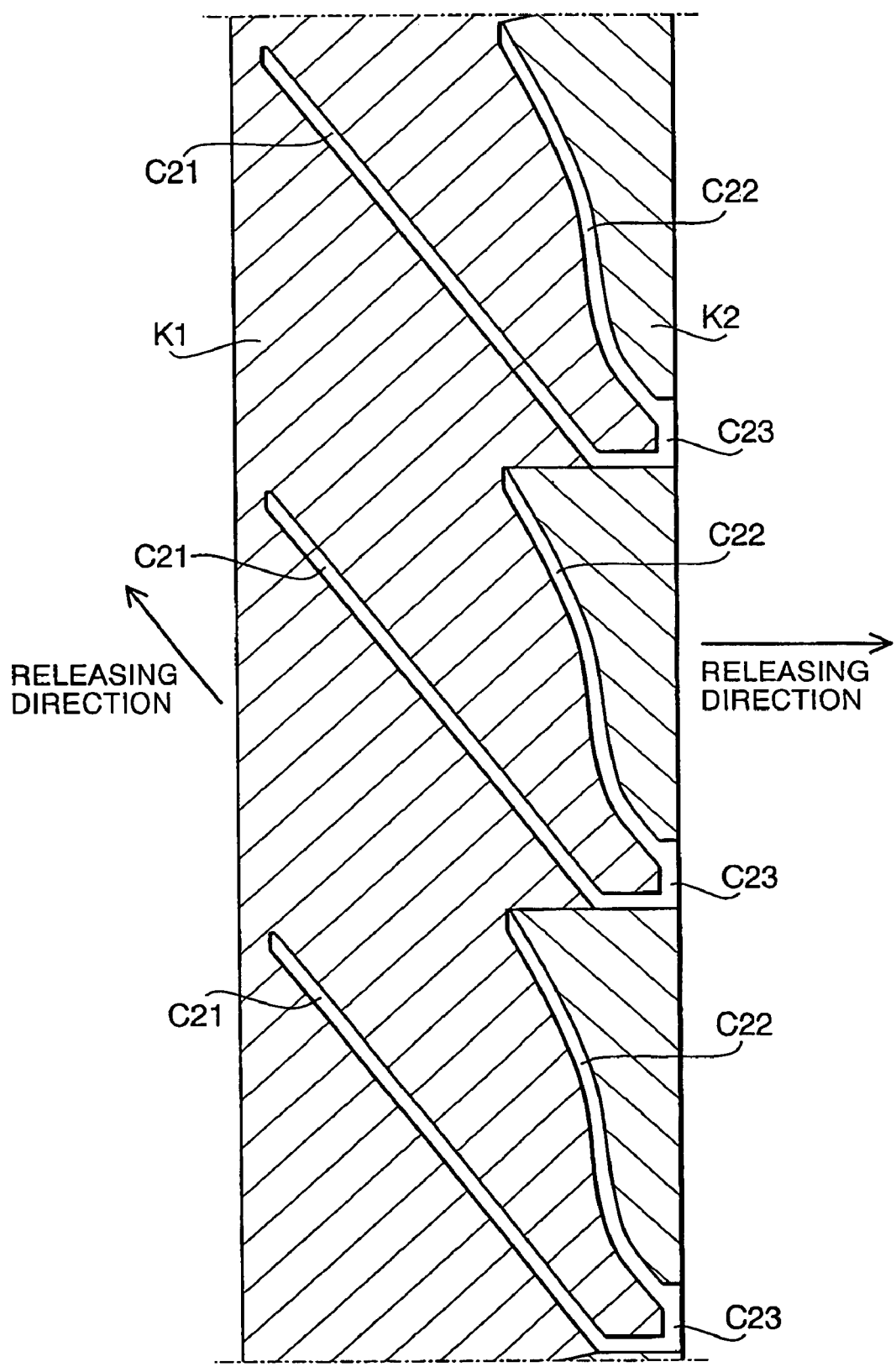
FIG. 5 is a development elevation of a metal mold for forming the cam ring.
Figure 6:
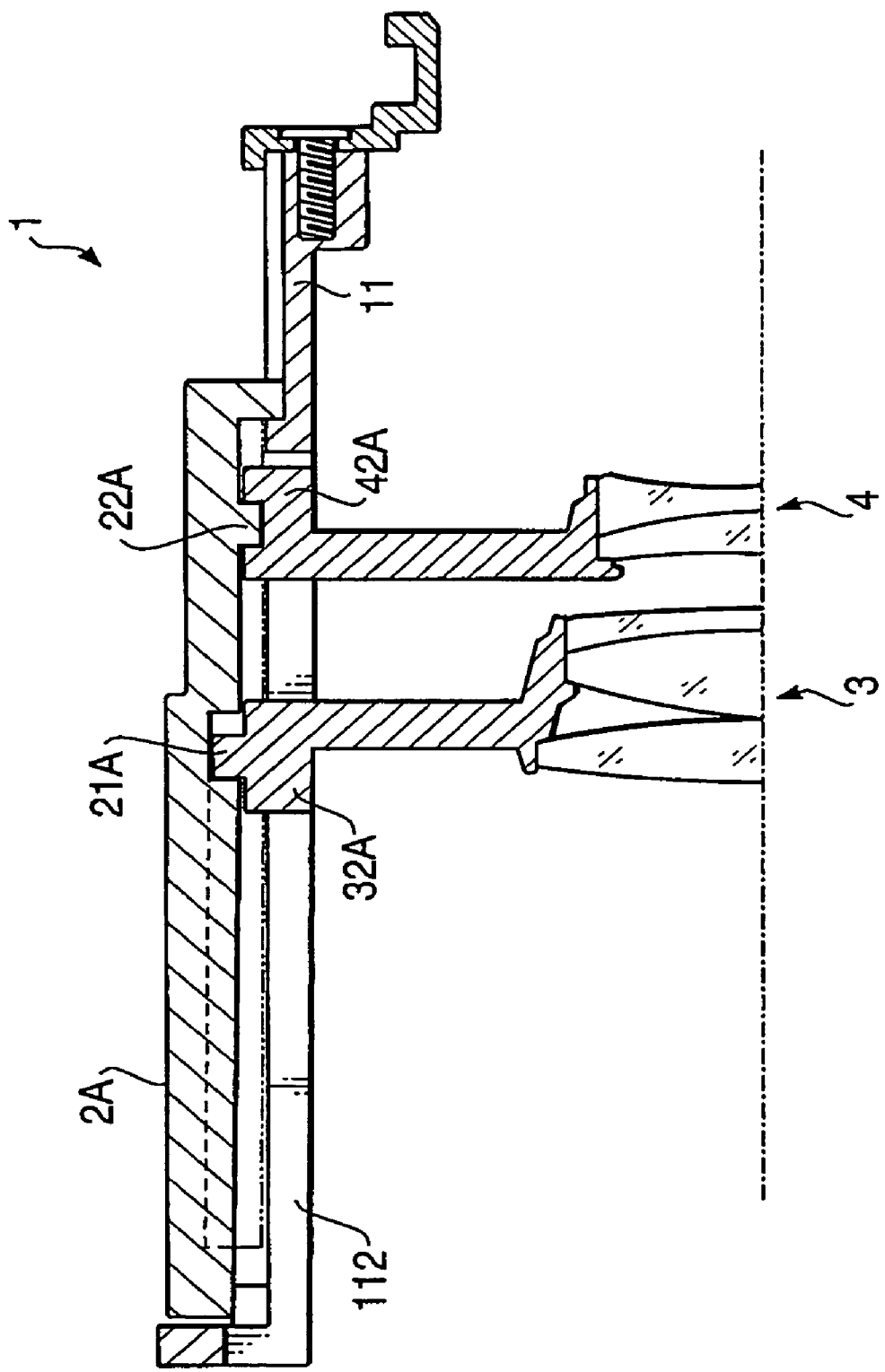
FIG. 6 is a half cross-sectional view of a conventional lens body tube with respect to the optical axis.

Moreover, when the cam ring 2 is formed by resin molding, as shown in FIG. 5 corresponding to the development elevation shown in FIG. 3, a pair of metal molds K1 and K2, which are released along the optical axis direction, is employed. The pair of metal molds K1 and K2 forms respective cavities C21, C22, and C23 of the first cam 21, the second cam 22, and the bayonet piece 23. The cavities C21, C22, and C23 are communicated with each other. The front metal mold K1 shown at the left side of FIG. 5 is configured as a metal mold that is released rotated around the optical axis when demolding the cam ring 2, while the metal mold K2 shown at the right side of FIG. 5 is configured as a metal mold that is released not rotated when demolding the cam ring 2. Especially, in the cam ring 2 of this embodiment, as aforementioned, since the second cam 22 is not overlapped in the optical direction with any adjacent first cams 21 in the circumferential direction in a more rear side area in the optical direction than the second cam 22, the rear metal mold K2 can be released. On the other hand, even though the second cam 22 is overlapped in the optical direction with the first cam 21 in a more front side area in the optical direction than the second cam 22, since the first cam 21 is a linear cam, the front metal mold can be released rotated. Therefore, even the cam ring 2 of this embodiment, in which the first and second cams 21 and 22 are overlapped with each other in the optical axis direction, can easily be fabricated by resin molding.

In addition, since each of the first and second cams 21 and 22, in this embodiment, has a rectangular cross section along the optical axis direction, the metal mold needs not be provided with a slider as the case of a cam having a trapezoidal cross section. Accordingly, such a cross section of the cam is advantageous in simplifying the metal mold structure.

The application of the present invention is not limited to a lens body tube provided with a cam ring of a cam shaped as shown in the embodiment. For example, the present invention may also be applied, in a similar fashion, to a cam ring that is configured such that a lens frame is engaged with a cam through a stem and a cam follower which are provided only at one place in the circumferential direction on the lens frame, that is, a lens body tube provided with one first cam and one second cam on the inner circumferential surface of a ring portion. In addition, the application of the present invention is not limited to a cam ring having two kinds of cams for driving two lenses. The present invention may also be applied to a lens body tube that is configured with a cam ring having more than two kinds of cams for driving more than two lenses. Further, places where cams are connected with each other are not limited at an end of a cam ring in the optical axis direction. The cams may be connected with each other at a part of a middle region of the cam ring in the optical axis direction, where the cams come close to each other.

The present disclosure relates to the subject matter contained in Japanese Patent Application No. P2004-315248, filed on Oct. 29, 2004, which is expressly incorporated herein by reference in its entirely.

What is claimed is:

1. A lens body tube configured to support at least one lens inside an inner tube such that the at least one lens can be translated along the optical axis direction of the lens body tube, comprising:

a cam ring configured to be rotatably supported around the outer circumferential surface of the inner tube, the at least one lens being configured to be translated along the optical axis direction accompanied by the rotation of the cam ring;

a plurality of cams provided on the inner circumferential surface of the cam ring, wherein the plurality of cams includes at least two protruded cams, and wherein the at least two protruded cams are connected with a part of each other by a protruding piece provided on the inner circumferential surface of the cam ring; and a plurality of cam followers provided on a lens frame supporting each of the at least one lens, each of the plurality of cam followers being engaged with a corresponding one of the plurality of cams.

2. The lens body tube according to claim 1, wherein the plurality of cams includes at least one pair of adjacent protruded cams, and wherein two cams of each of the at least one pair of adjacent protruded cams are connected with a part of each other by a protruded piece provided on the inner circumferential surface of the cam ring.

3. The lens body tube according to claim 1, wherein the at least two protruded cams are connected with one end of each other in the optical axis direction.

4. The lens body tube according to claim 2,
wherein two cams of each of the at least one pair of adjacent protruded cams are connected with one end of each other in the optical axis direction.

5. The lens body tube according to claim 4,
wherein the at least one pair of adjacent protruded cams is arranged in the circumferential direction of the lens body tube such that each adjacent pairs thereof in the circumferential direction are not overlapped in the optical axis direction,
wherein two cams of each of the at least one pair of adjacent protruded cams are overlapped in the optical axis direction, and
wherein each of the at least one pair of adjacent protruded cams includes one linear cam that extends farther from the connected end thereof in the optical direction than the other.

6. The lens body tube according to claim 1, wherein the cam ring is formed by resin molding.

7. The lens body tube according to claim 3, wherein the cam ring is formed by resin molding.

8. The lens body tube according to claim 5, wherein the cam ring is formed by resin molding.

9. The lens body tube according to claim 6, wherein each of the protruded cams has a rectangular cross section.

10. The lens body tube according to claim 7, wherein each of the protruded cams has a rectangular cross section.

11. The lens body tube according to claim 8, wherein each of the protruded cams has a rectangular cross section.

12. The lens body tube according to claim 1, wherein the cam ring is rotated during one of a zooming operation and a focusing operation.

13. The lens body tube according to claim 3, wherein the cam ring is rotated during one of a zooming operation and a focusing operation.

* * * * *